US011353349B2

(12) United States Patent
Nakatsuchi et al.

(10) Patent No.: US 11,353,349 B2
(45) Date of Patent: Jun. 7, 2022

(54) FLOW-RATE SENSOR

(71) Applicant: Hitachi Automotive Systems, Ltd., Hitachinaka (JP)

(72) Inventors: Hiroki Nakatsuchi, Tokyo (JP); Yasuo Onose, Hitachinaka (JP); Takayuki Yogo, Hitachinaka (JP); Ryotaro Shimada, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/256,908

(22) PCT Filed: Jun. 20, 2019

(86) PCT No.: PCT/JP2019/024467
§ 371 (c)(1),
(2) Date: Dec. 29, 2020

(87) PCT Pub. No.: WO2020/012908
PCT Pub. Date: Jan. 16, 2020

(65) Prior Publication Data
US 2021/0278263 A1 Sep. 9, 2021

(30) Foreign Application Priority Data

Jul. 12, 2018 (JP) .............................. JP2018-132464

(51) Int. Cl.
*G01F 1/692* (2006.01)
*G01F 1/38* (2006.01)
*G01F 1/684* (2006.01)

(52) U.S. Cl.
CPC ................ *G01F 1/692* (2013.01); *G01F 1/38* (2013.01); *G01F 1/684* (2013.01)

(58) Field of Classification Search
CPC ............. G01F 1/692; G01F 1/38; G01F 1/684
See application file for complete search history.

(56) References Cited

U.S. PATENT DOCUMENTS

2015/0344294 A1 12/2015 Ghahremani et al.
2016/0146652 A1* 5/2016 Ishitsuka ................. G01F 1/684
438/54

FOREIGN PATENT DOCUMENTS

JP  2009-36639 A   2/2009
JP  2014-98621 A   5/2014
(Continued)

OTHER PUBLICATIONS

International Search Report (PCT/ISA/210) issued in PCT Application No. PCT/JP2019/024467 dated Jul. 23, 2019 with English translation (five (5) pages).
(Continued)

*Primary Examiner* — Ryan D Walsh
(74) *Attorney, Agent, or Firm* — Crowell & Moring LLP

(57) ABSTRACT

A flow-rate sensor is provided with a lead frame, a semiconductor chip that is disposed on one surface of the lead frame, and in which a diaphragm including a void portion on the lead frame side is formed, a flow rate detecting unit that is formed on the one surface including the diaphragm of the semiconductor chip, and resin that includes a flow passage opening portion exposing at least a portion of the flow rate detecting unit formed on the diaphragm, and covers the lead frame and the semiconductor chip. A lower side resin portion of the resin covering another surface side of the lead frame, on an opposite side to the one surface side thereof, has a thinned portion that is thinner than a periphery thereof in a region facing a peripheral edge portion of the diaphragm.

7 Claims, 13 Drawing Sheets

(56) References Cited

FOREIGN PATENT DOCUMENTS

| | | | | |
|---|---|---|---|---|
| JP | 2015014578 A | * | 1/2015 | |
| JP | 2016023969 A | * | 2/2016 | |
| JP | 2016128770 A | * | 7/2016 | ............. G01F 1/692 |
| JP | 2017-20982 A | | 1/2017 | |
| JP | 2017-203709 A | | 11/2017 | |
| WO | WO 2015/033589 A1 | | 3/2015 | |

OTHER PUBLICATIONS

Japanese-language Written Opinion (PCT/ISA/237) issued in PCT Application No. PCT/JP2019/024467 dated Jul. 23, 2019 (five (5) pages).

\* cited by examiner

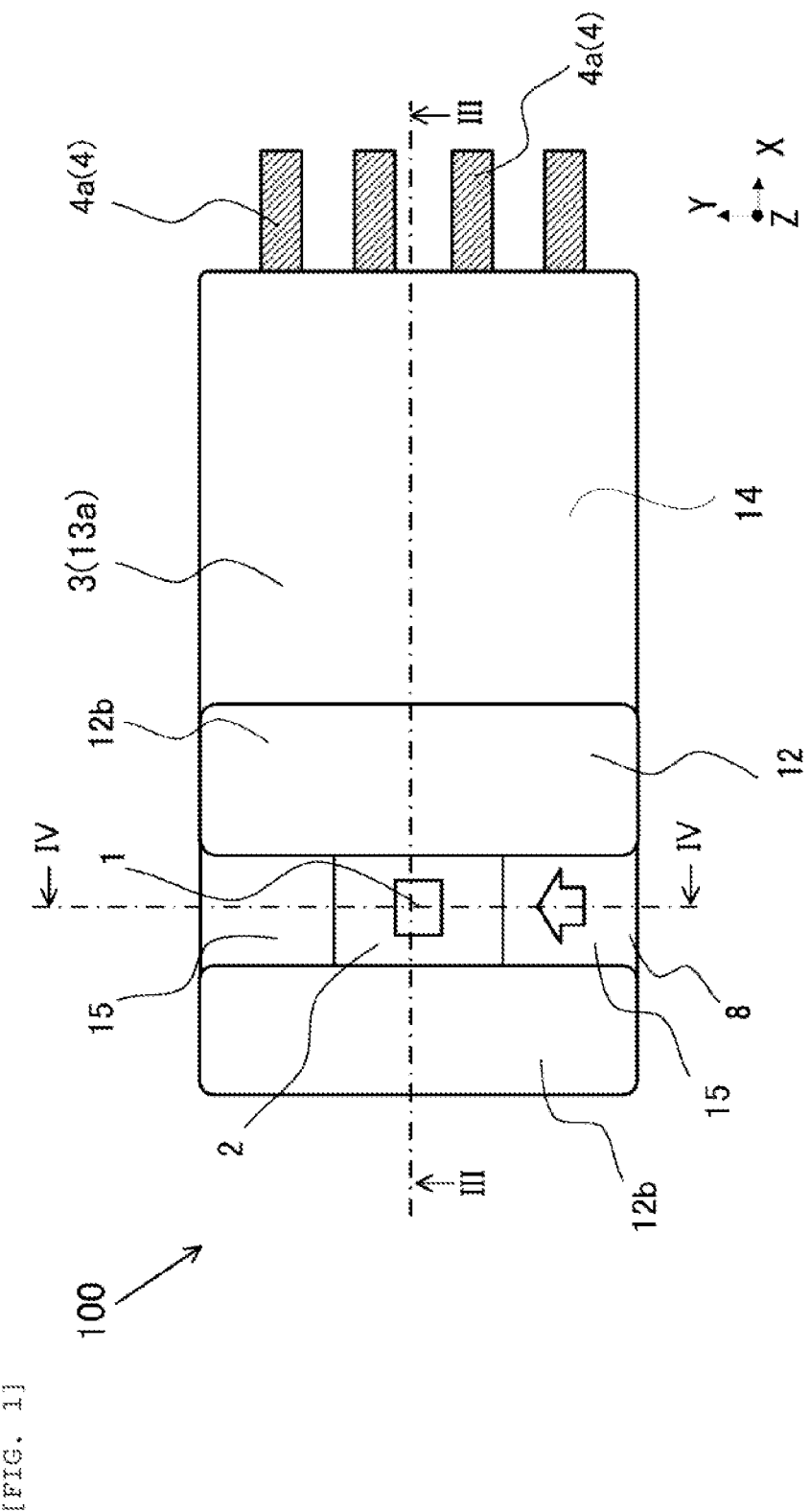
[FIG. 1]

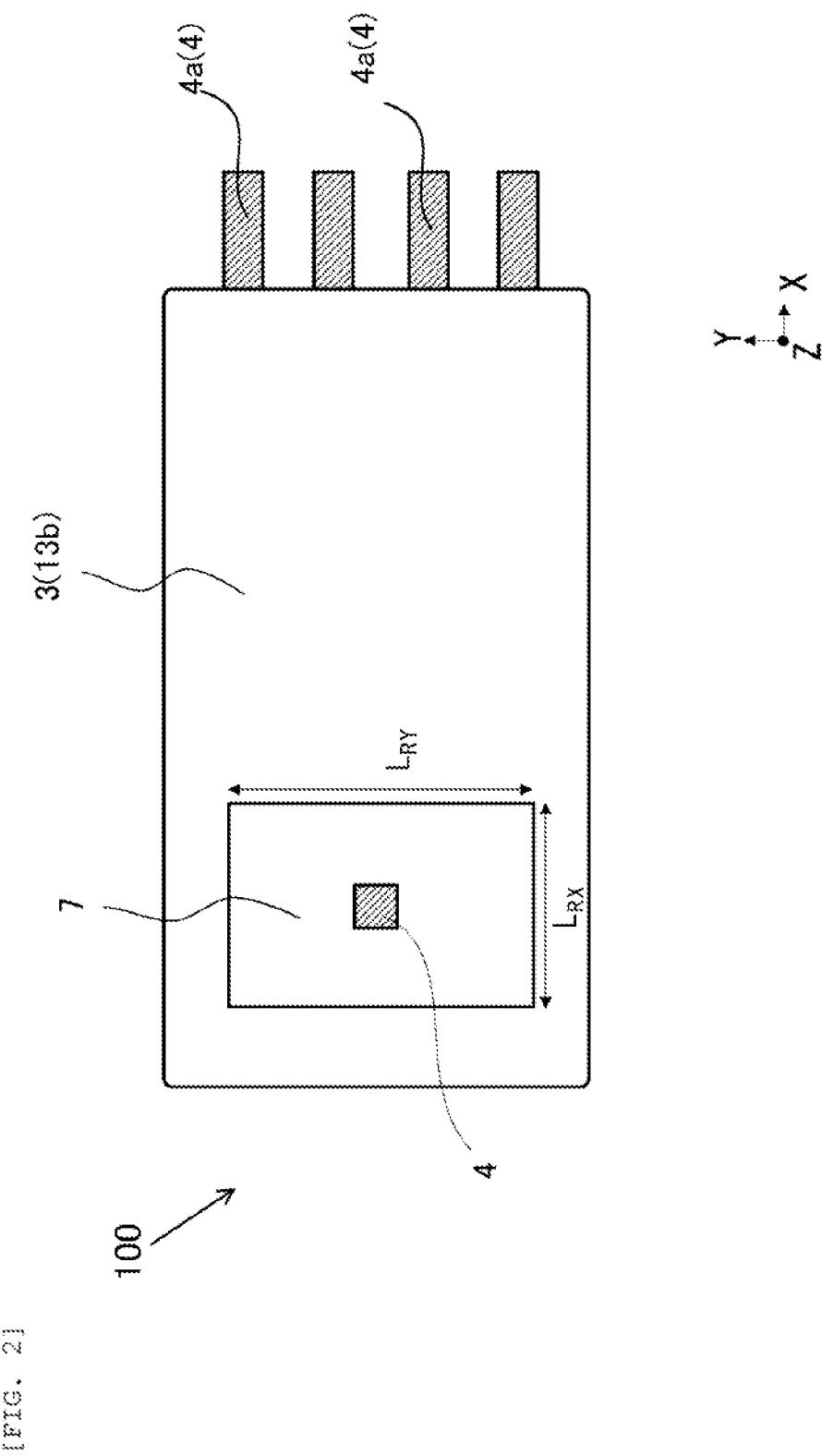
[FIG. 2]

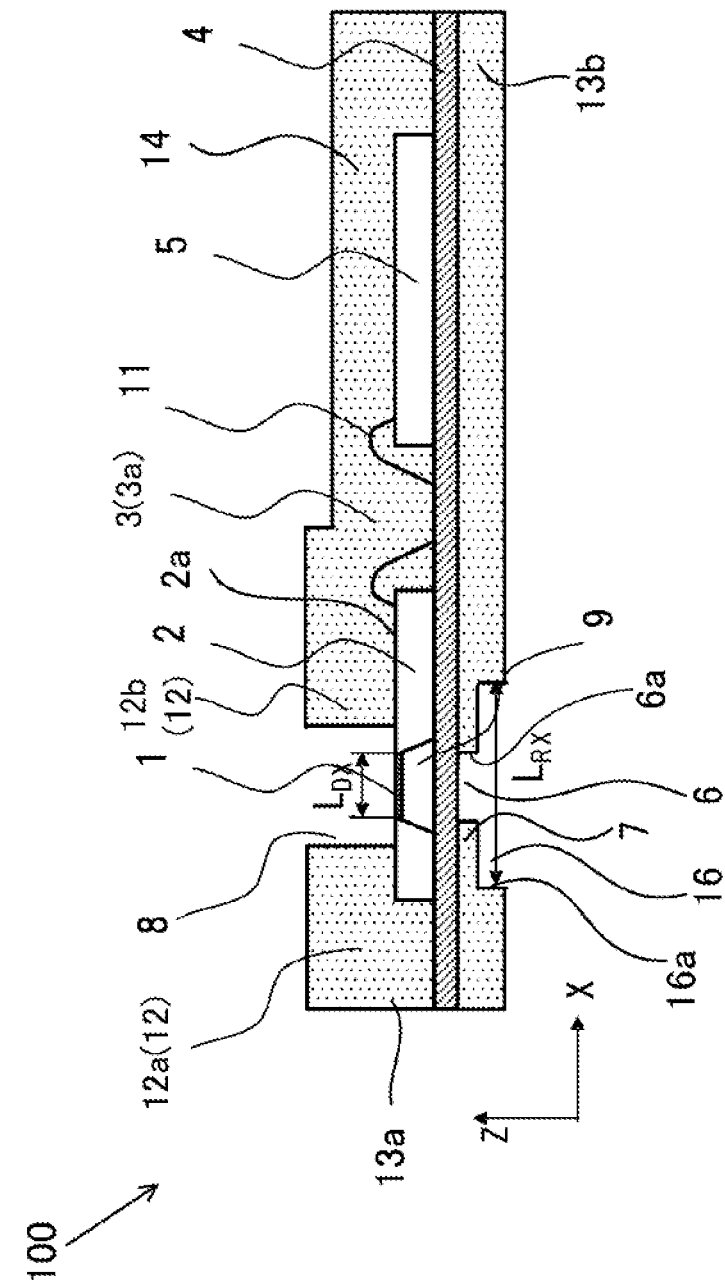
[FIG. 3]

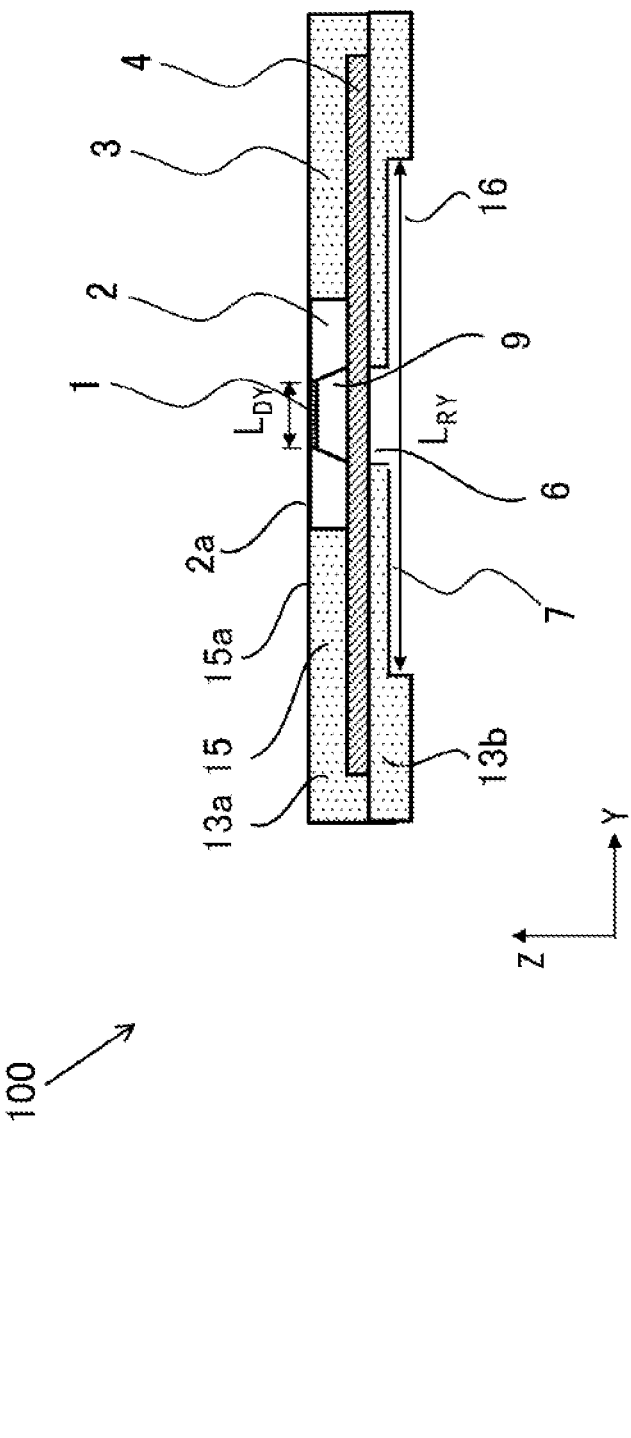

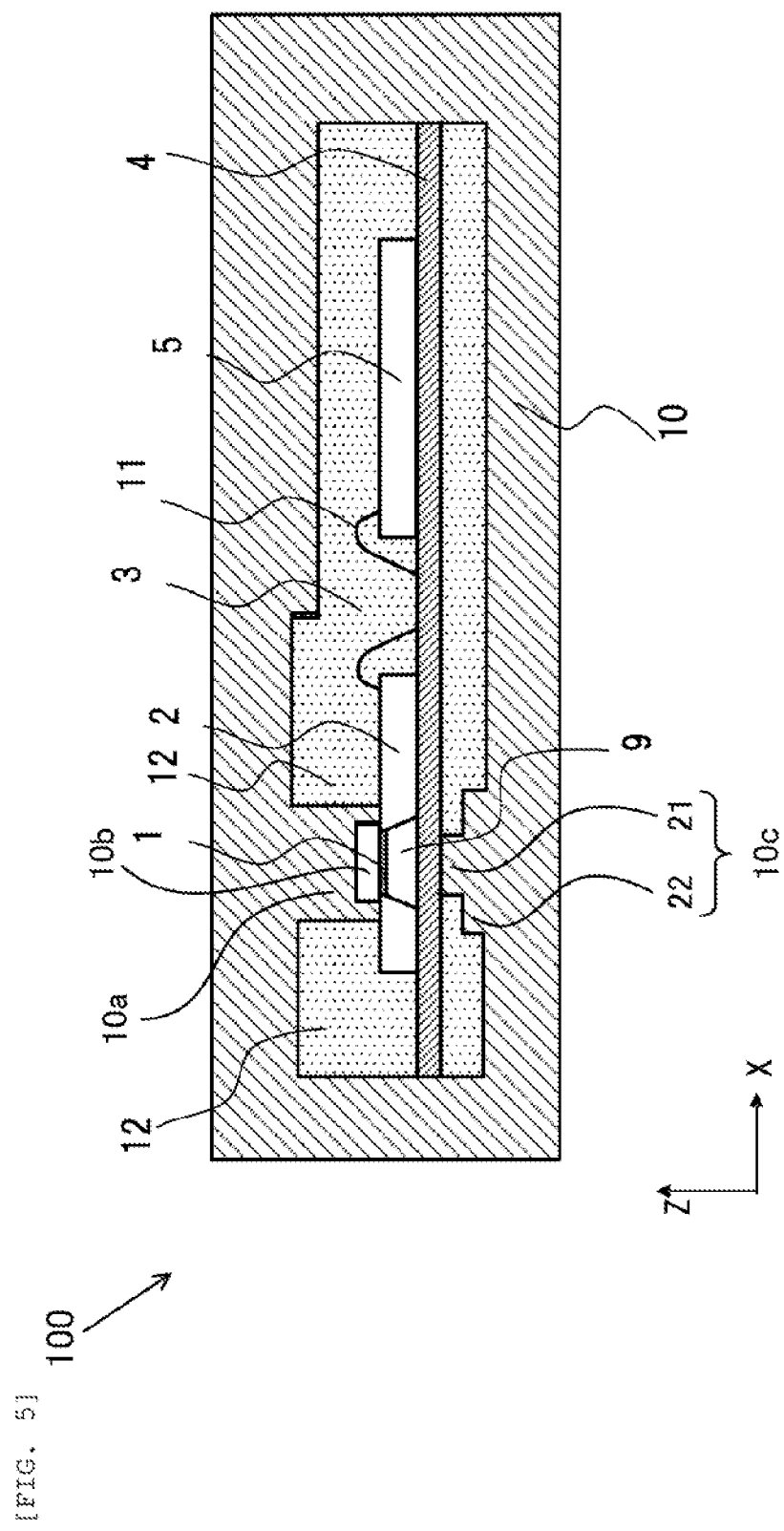
[FIG. 5]

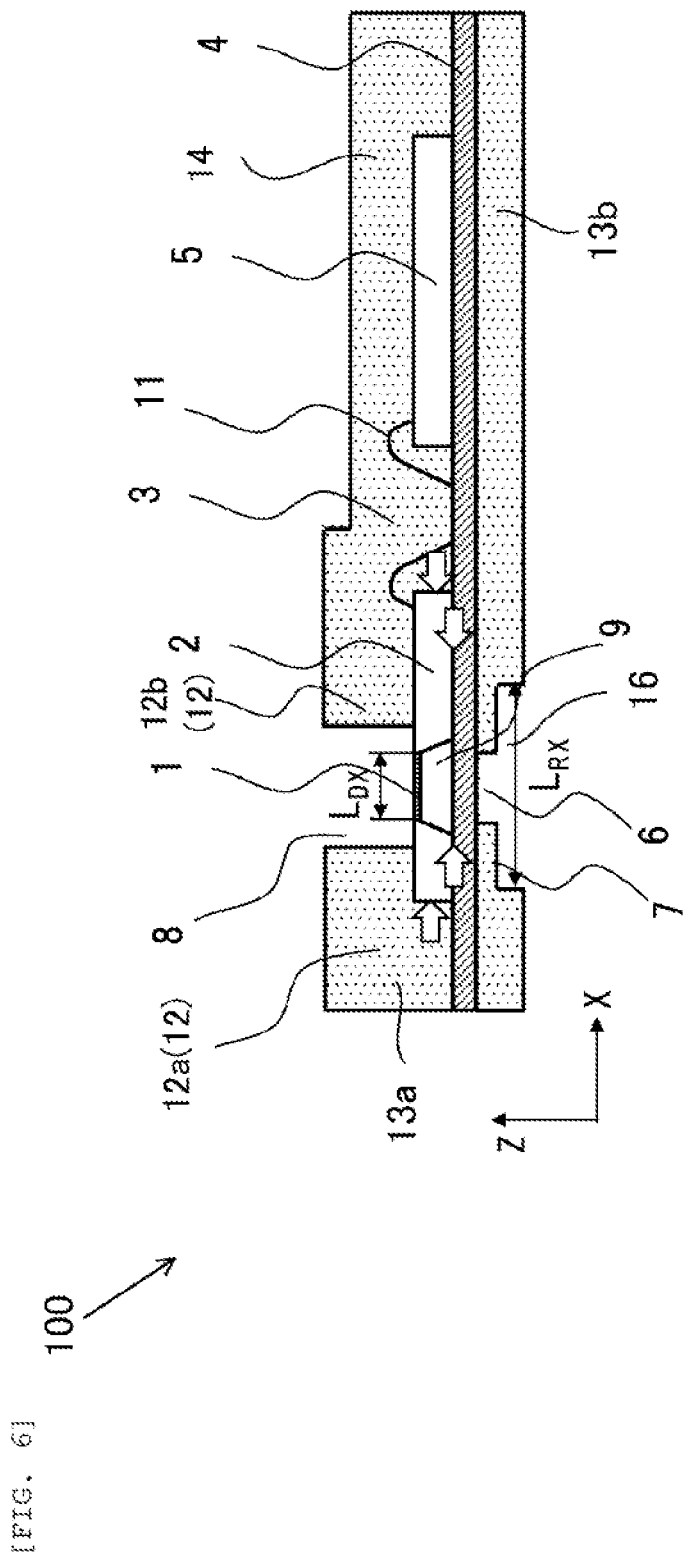
[FIG. 6]

[FIG. 7]
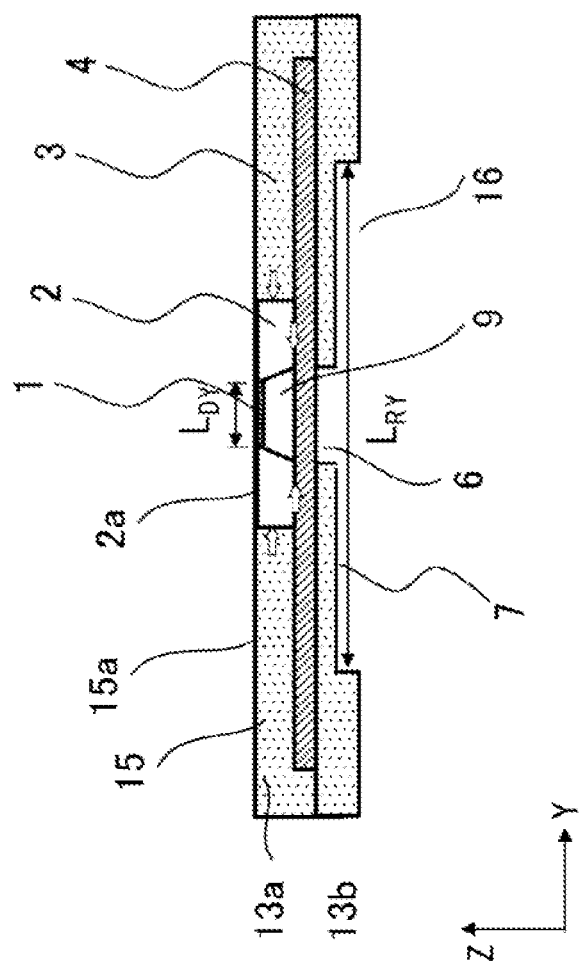

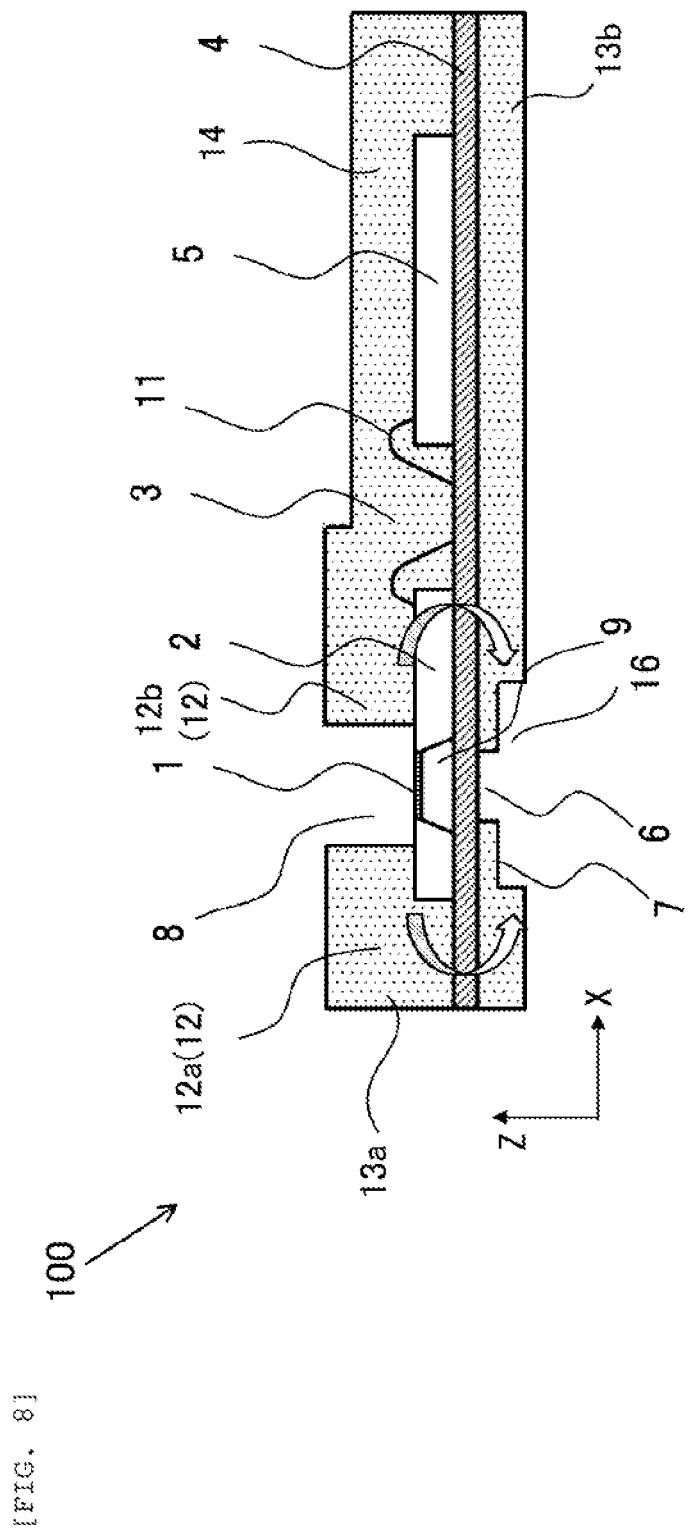
[FIG. 8]

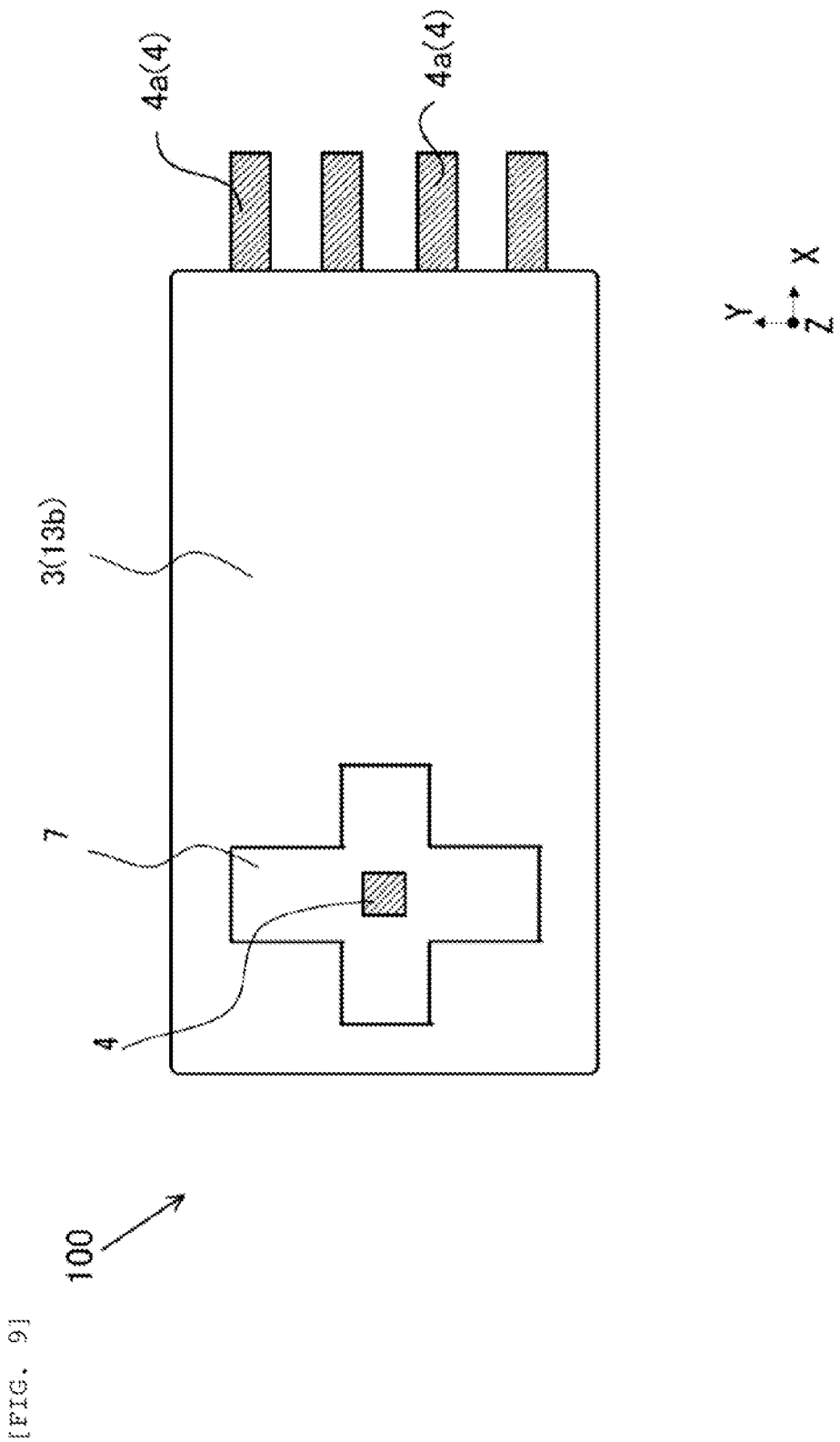

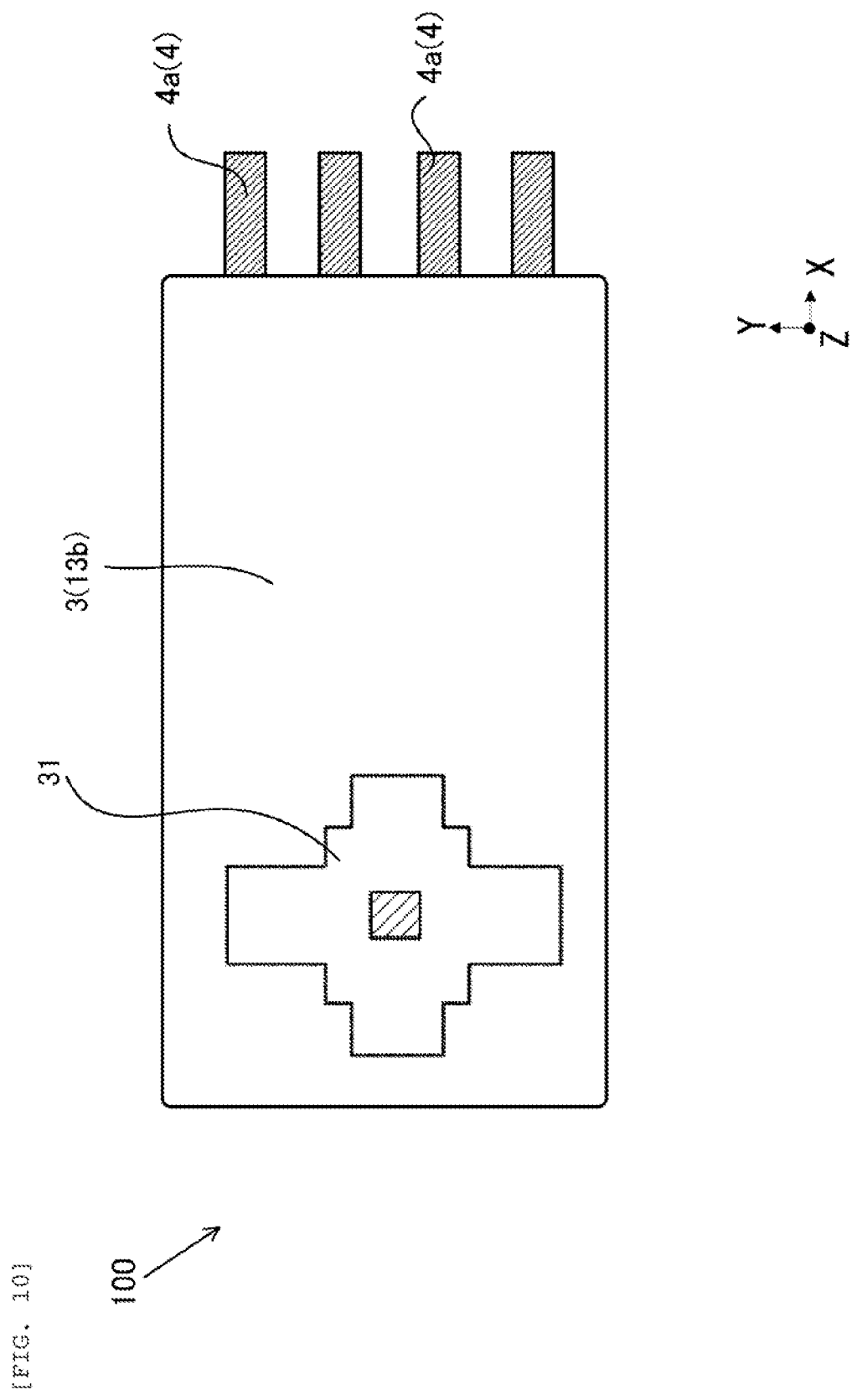

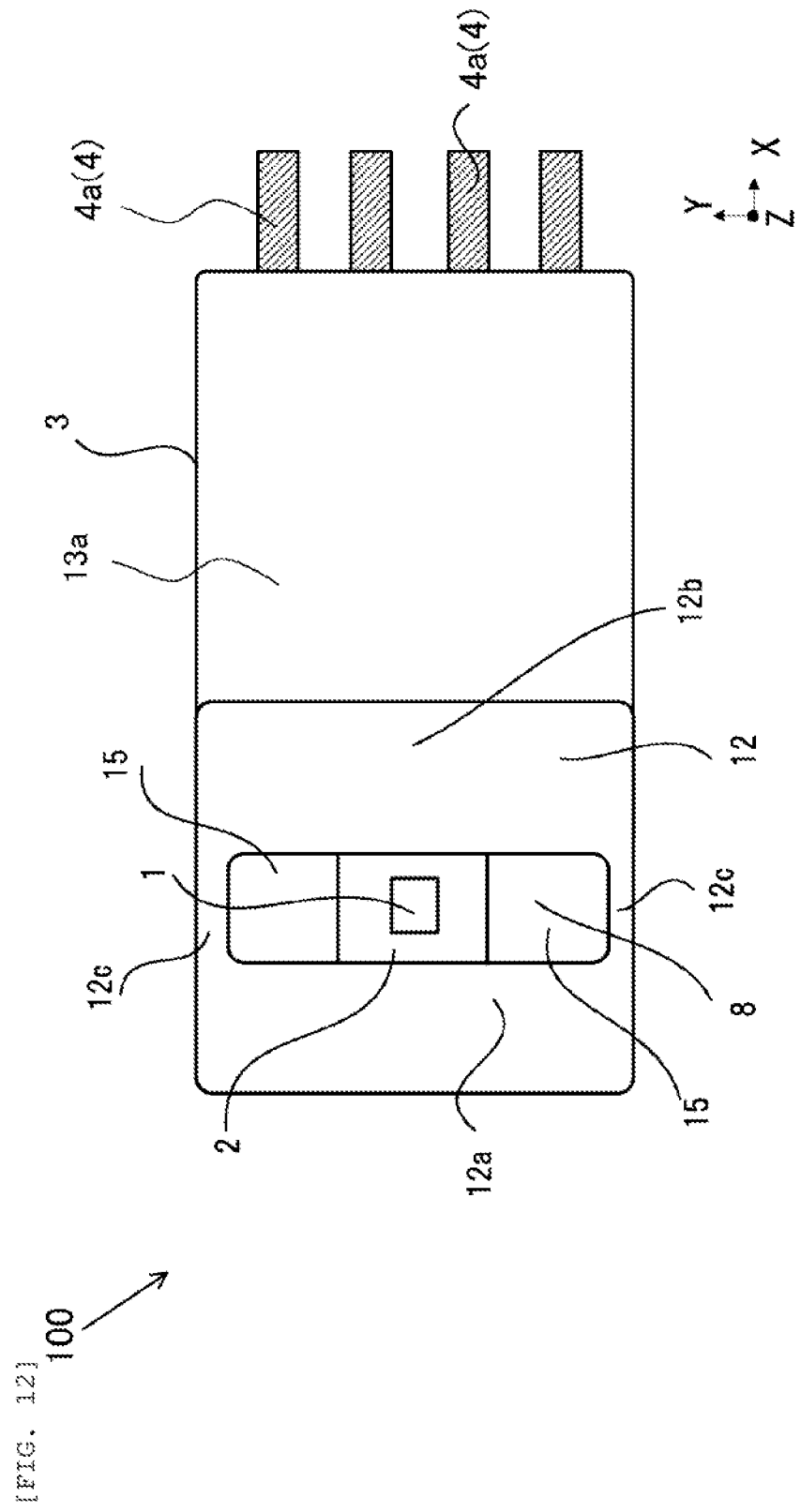

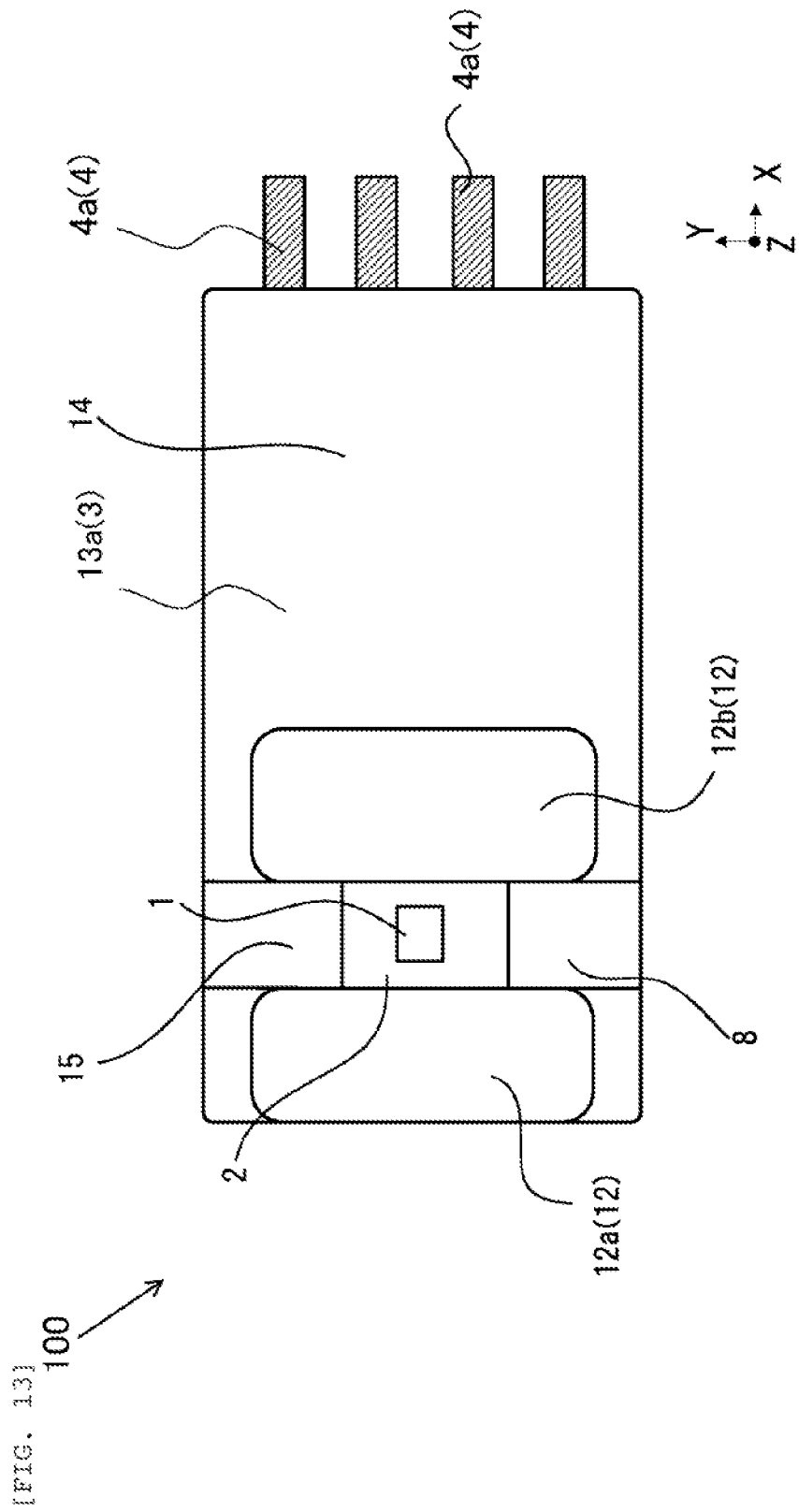

FLOW-RATE SENSOR

TECHNICAL FIELD

The present invention relates to a flow-rate sensor.

BACKGROUND ART

There has been known a flow-rate sensor in which a diaphragm is formed on a semiconductor chip by using micromachining technology and a flow rate detecting unit is provided on the diaphragm. Such a flow-rate sensor is used, for example, for measuring a flow rate of air flowing into an internal combustion engine such as an automobile.

The above flow-rate sensor is formed by resin molding in a state where the semiconductor chip on which the flow rate detecting unit is provided on the diaphragm is mounted on a lead frame, so that the flow rate detecting unit is exposed (for example, see PTL 1).

CITATION LIST

Patent Literature

PTL 1: WO 2015/033589

SUMMARY OF INVENTION

Technical Problem

PTL 1 does not disclose deterioration of detection accuracy due to deformation of the diaphragm during the resin molding.

Solution to Problem

A flow-rate sensor according to one aspect of the invention is provided with a lead frame, a semiconductor chip that is disposed on one surface of the lead frame, and in which a diaphragm including a void portion on the lead frame side is formed, a flow rate detecting unit that is formed on the one surface including the diaphragm of the semiconductor chip, and resin that includes a flow passage opening portion exposing at least a portion of the flow rate detecting unit formed on the diaphragm, and covers the lead frame and the semiconductor chip. A lower side resin portion of the resin covering another surface side, which is on an opposite side to the one surface side of the lead frame, has a thinned portion that is thinner than a periphery thereof in a region facing a peripheral edge portion of the diaphragm.

Advantageous Effect

According to the invention, deterioration of detection accuracy due to deformation of the diaphragm during resin molding can be prevented.

BRIEF DESCRIPTION OF DRAWINGS

FIG. 1 is a plan view of a flow-rate sensor according to one embodiment of the invention as viewed from an upper surface side.

FIG. 2 is a plan view of the flow-rate sensor shown in FIG. 1 as viewed from a back surface side.

FIG. 3 is a cross-sectional view taken along a line III-III of the flow-rate sensor shown in FIG. 1.

FIG. 4 is a cross-sectional view taken along a line IV-IV of the flow-rate sensor shown in FIG. 1.

FIG. 5 is a cross-sectional view showing a resin sealing process of the flow-rate sensor according to the invention.

FIG. 6 is a diagram for illustrating a compressive force in an X direction acting on a diaphragm of the flow-rate sensor during resin molding.

FIG. 7 is a diagram for illustrating a compressive force in a Y direction acting on the diaphragm of the flow-rate sensor during the resin molding.

FIG. 8 is a diagram for illustrating bending deformation acting on the diaphragm of the flow-rate sensor due to shrinkage of the resin molding.

FIG. 9 shows a flow-rate sensor according to a first modification of the invention, and is a plan view as viewed from a back surface side of the flow-rate sensor.

FIG. 10 shows a flow-rate sensor according to a second modification of the invention, and is a plan view as viewed from a back surface side of the flow-rate sensor.

FIGS. 11A and 11B show a flow-rate sensor according to a third modification of the invention, in which FIG. 11A is a cross-sectional view corresponding to FIG. 3, and FIG. 11B is a cross-sectional view corresponding to FIG. 4.

FIG. 12 shows a flow-rate sensor according to a fourth modification of the invention, and is a plan view as viewed from an upper surface side of the flow-rate sensor.

FIG. 13 shows a flow-rate sensor according to a fifth modification of the invention, and is a plan view as viewed from an upper surface side of the flow-rate sensor.

DESCRIPTION OF EMBODIMENTS

Figure 11A:
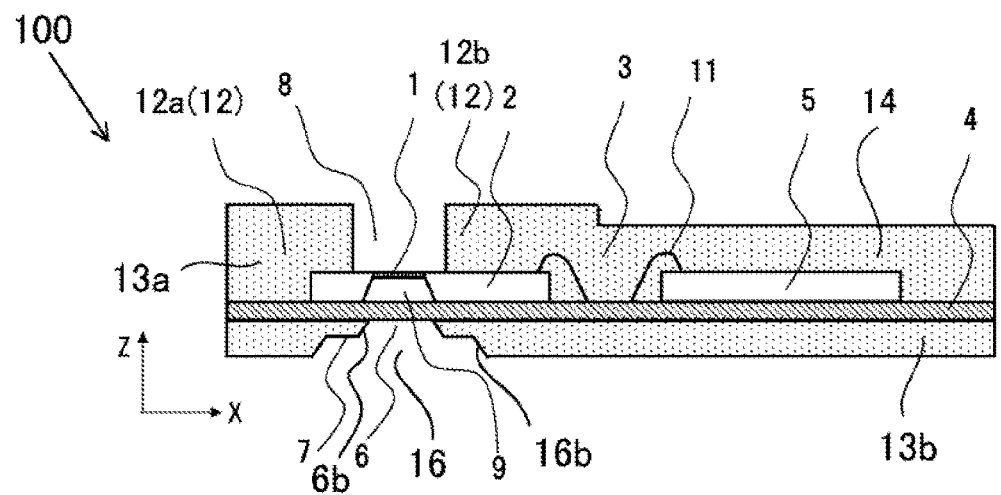

Hereinafter, an embodiment of the invention will be described with reference to the drawings. The following description and drawings are examples for describing the invention, and are omitted and simplified as appropriate for clarification of the description. The invention can be implemented in various other forms. Unless otherwise limited, each configuration component may be singular or plural.

In order to facilitate understanding of the invention, a position, a size, a shape, a range, or the like of each configuration component shown in the drawings may not represent an actual position, size, shape, range, or the like. Therefore, the invention is not necessarily limited to the position, size, shape, range, or the like disclosed in the drawings.

FIG. 1 is a plan view of a flow-rate sensor according to one embodiment of the invention as viewed from an upper surface side, FIG. 2 is a plan view of the flow-rate sensor shown in FIG. 1 as viewed from a back surface side, FIG. 3 is a cross-sectional view taken along a line of the flow-rate sensor shown in FIG. 1, and FIG. 4 is a cross-sectional view taken along a line IV-IV of the flow-rate sensor shown in FIG. 1.

In the following description, an X direction, a Y direction, and a Z direction are as shown in the figure.

As shown in FIG. 3, a flow-rate sensor 100 includes a lead frame 4, a first semiconductor chip 2, a second semiconductor chip 5, a wire 11, and a resin 3.

The lead frame 4 is formed of, for example, a metal such as copper. The lead frame 4 is disposed separately from a mounting portion (not shown) having a large area on which the first semiconductor chip 2 and the second semiconductor chip 5 are mounted and a mounting portion thereof, and the lead frame 4 includes a plurality of lead portions 4a (see FIGS. 1 and 2) that are electrically connected to the mounting portion by wires (not shown).

The first semiconductor chip 2 and the second semiconductor chip 5 are fixed to an upper surface in the Z direction (hereinafter, may be simply referred to as "upper surface") of the mounting portion of the lead frame 4 with an adhesive agent (not shown). As the adhesive agent, a resin containing a thermoset resin such as an epoxy resin and a polyurethane resin, or a thermoplastic resin such as a polyimide resin, an acrylic resin and a fluororesin as a main component can be used. Inorganic fine particles in which glass, carbon, mica or the like is contained as the main component may be mixed in the resin.

A diaphragm 1 is formed on an upper surface side of the first semiconductor chip 2. The diaphragm 1 is a portion thinner than a periphery, and a void portion 9 is provided below the diaphragm 1. The diaphragm 1 is formed by cutting out the first semiconductor chip 2 from a lower surface side and forming the rectangular trapezoidal void portion 9.

A flow rate detecting unit (not shown) is formed on an upper surface of the first semiconductor chip 2. The flow rate detecting unit includes, for example, a heat-generating resistor provided on an upper surface of the diaphragm 1, and a pair of measuring resistors disposed on both sides of this heat-generating resistor, and includes a heater control bridge and a temperature sensor bridge. The heat-generating resistor and the pair of measuring resistors are arranged along a direction in which a gas such as air for detecting a flow rate flows. Specifically, the heat-generating resistor and the pair of measuring resistors are disposed such that the measuring resistor on an upstream side where a gas to be measured flows is cooled by the gas, and the measuring resistor on a downstream side is warmed by heat from the heat-generating resistor. The second semiconductor chip 5 is configured with a CPU, an input circuit, an output circuit, a memory, and the like, and includes a control circuit for measuring a flow rate.

When the gas flows, the measuring resistor on the upstream side of the heat-generating resistor is cooled, and a temperature of the measuring resistor on the downstream side of the heat-generating resistor rises due to the gas whose temperature is risen due to the heat-generating resistor. The flow rate of the gas is obtained based on a difference potential generated by a temperature difference between the pair of measuring resistors. Details of such a flow rate detecting unit are described in WO 2015/033589 described as PTL 1.

However, the flow rate detecting unit is not limited to implement of the above method, and may be implemented by another method.

The first semiconductor chip 2 and the second semiconductor chip 5 are respectively bonded to the lead frame 4 by a wire formed of gold or the like.

As shown in FIG. 3, the resin 3 is formed by covering the lead frame 4, the first semiconductor chip 2, the second semiconductor chip 5, and the wire 11, except for a region of a peripheral edge portion of the diaphragm 1 and a region on the lower surface side of the lead frame 4 facing the diaphragm 1. As a material of the resin 3, a thermoset resin such as an epoxy resin or a phenol resin, or a thermoplastic resin such as polycarbonate, polyethylene terephthalate, polyphenylene sulfide, or polybutylene terephthalate can be used. Further, metal fine particles such as gold, silver, copper and tin, or inorganic fine particles in which silica, glass, carbon, mica, talc and the like are contained as main components may be mixed in the resin. The resin 3 can be made conductive, and a linear expansion coefficient of the resin 3 can be adjusted.

As shown in FIGS. 3 and 4, an upper side resin portion 13a above the lead frame 4 in the Z direction includes a raised portion 12 that covers the first semiconductor chip 2, a base portion 14 that covers the second semiconductor chip 5, and a lower back portion 15 including a surface 15a flush with an upper surface 2a of the first semiconductor chip 2. The raised portion 12 of the upper side resin portion 13a is provided with an opening portion 8 that exposes the diaphragm 1 and a peripheral edge portion in a vicinity of the diaphragm 1. As shown in FIG. 1, the opening portion 8 is provided over an entire length of the flow-rate sensor 100 in the Y direction, and the lower back portion 15 is provided in the opening portion 8. The raised portion 12 includes a first raised portion 12a that covers a region extending to one side of the first semiconductor chip 2, and a second raised portion 12b that is provided so as to be separated from the first raised portion in the X direction with the opening portion 8 sandwiched therebetween and covers a region on the other side opposite to the one side of the first semiconductor chip 2. That is, a pair of raised portions 12 formed on the upper side resin portion 13a are formed on both sides in the X direction with the opening portion 8 sandwiched therebetween. In the opening portion 8 of the resin 3, as shown in FIG. 4, the surface 15a of the lower back portion 15 of the resin 3 is flush with the upper surface 2a of the first semiconductor chip 2. Therefore, as shown by an arrow in FIG. 1, the gas such as air whose flow rate is to be measured is guided by the opening portion 8 provided between the raised portions 12 of the upper side resin portion 13a so as to flow in the Y direction.

In a lower side resin portion 13b below the lead frame 4 in the Z direction, a rectangular opening 6 and a groove 16 which is a recess surrounding the opening 6 are formed in a region facing the diaphragm 1 with the lead frame 4 sandwiched therebetween. The lead frame 4 is exposed from the opening 6. As shown in FIG. 2, the opening 6 and the groove 16 have a rectangular shape in a plan view. In the lower side resin portion 13b, a thinned portion 7 is formed between a side surface 16a of the groove 16 and a side surface 6a of the opening 6. The side surface of the opening 6, which is an inner side surface of the thinned portion 7, is located inside the void portion 9 provided below the diaphragm 1, and the side surface 16a of the groove 16, which is an outer side surface of the thinned portion 7, is located outside the void portion 9 provided below the diaphragm 1. In other words, with reference to FIG. 3, projection of each of the side surface 6a of the opening 6 on a plus side in the X direction and the side surface 6a on a minus side in the X direction on a semiconductor chip 2 side is located in a region where the void portion 9 expands. Projection of each of the side surface 16a of the groove 16 on the plus side in the X direction and the side surface 16a on the minus side in the X direction on the semiconductor chip 2 side is located outside the region where the void portion 9 expands.

A region outside the side surface 16a of the groove 16 of the lower side resin portion 13b, that is, a region of the lower side resin portion 13b surrounding the groove 16 is a thicken portion thicker than the thinned portion 7. The thicken portion has a uniform thickness throughout, and a bottom surface thereof is flat. The thinned portion 7 is formed only in the peripheral edge portion in the vicinity of the region facing the diaphragm 1. Therefore, as will be described later, bending deformation can be effectively applied to the diaphragm 1.

FIG. 5 is a cross-sectional view showing a resin sealing process of the flow-rate sensor according to the invention, and shows a cross-sectional view of a state in which the flow-rate sensor is installed in a mold and molded.

An outline of a process of forming the flow-rate sensor 100 is shown below.

The first semiconductor chip 2 having the diaphragm 1 and the second semiconductor chip 5 are adhered to the mounting portion of the lead frame 4 including the lead portion 4a with the adhesive agent. Although not shown, at this point, the lead frame 4 has a dam bar connecting the mounting portion and the lead portion 4a on an outer periphery of the lead frame 4. The first semiconductor chip 2 and the lead frame 4, and the second semiconductor chip 5 and the lead frame 4 are respectively bonded by the wires 11. Further, each lead portion 4a and the mounting portion of the lead frame 4 are bonded by a wire (not shown). Then, in this state, the flow-rate sensor 100 is installed in a mold 10 and molded. The mold 10 is made of an upper mold and a lower mold, but in FIG. 5, the upper mold and the lower mold are shown as one without being separated.

The diaphragm 1 and the peripheral edge portion in the vicinity thereof are exposed from the resin 3. Therefore, a vicinity of the upper surface of the diaphragm 1 is clamped by a clamp portion 10a. However, since the diaphragm 1 has a thin film structure, a void 10b is provided in a portion of the clamp portion 10a facing the diaphragm 1, so that the mold 10 does not directly come into contact with the diaphragm 1. In this way, the clamp portion 10a can be in contact with only the first semiconductor chip 2 in the vicinity of the peripheral edge portion of the diaphragm 1 and not in contact with the diaphragm 1. As a result, deformation of the diaphragm 1 due to a pressing force of the clamp portion 10a can be prevented. The clamp portion 10a may be formed separately from the mold 10, and may be attached to the mold 10 so as to be movable in the Z direction. A region where the clamp portion 10a is provided is the opening portion 8 of the resin 3.

Although not shown, a low-rigidity film may be sandwiched between the clamp portion 10a and the first semiconductor chip 2 so as to prevent damage to the first semiconductor chip 2. By interposing the low-rigidity film between the clamp portion 10a and the first semiconductor chip 2, the pressing force of the clamp portion 10a against the first semiconductor chip 2 is alleviated, and the deformation of the diaphragm 1 is further alleviated. In addition, infiltration of the resin 3 into the diaphragm 1 side can be prevented more effectively.

A portion of the lead frame 4 facing the void portion 9 provided below the diaphragm 1 is supported by a support portion 10c provided in the mold 10. The support portion 10c has a shape in which the opening 6, the thinned portion 7, and the groove 16 are formed in the resin 3. That is, the support portion 10c has a shape in which an opening forming portion 21 for forming the opening 6 protrudes above a groove forming portion 22 for forming the groove 16. A height of the opening forming portion 21 in the Z direction should match a thickness of the thinned portion 7.

After setting each member as shown in FIG. 5, a resin material 3a is poured into the mold 10 and a cavity is filled with the resin material 3a. After that, the resin material 3a is cooled and cured. Then, when a sealed semiconductor chip intermediate is taken out from the mold 10 and the dam bar is cut, the flow-rate sensor 100 packaged with the resin 3 shown in FIGS. 1 to 4 is obtained.

In a cooling process from the resin material 3a being poured into the mold 10 to the resin material 3a being cured, since the resin material 3a and the lead frame 4 shrink, this shrinking force acts on the first semiconductor chip 2. That is, a compressive force acts on an outer peripheral surface of the first semiconductor chip 2 during resin molding.

FIG. 6 is a diagram for illustrating a compressive force in the X direction acting on the diaphragm of the flow-rate sensor during the resin molding, and FIG. 7 is a diagram for illustrating a compressive force in the Y direction acting on the diaphragm of the flow-rate sensor during the resin molding.

The lead frame 4 made of metal and the resin 3 have linear expansion coefficients larger than that of the first semiconductor chip 2 made of a semiconductor material such as silicon. Therefore, in the cooling process, a load due to the shrinkage of the lead frame 4 and the resin 3 acts on the first semiconductor chip 2. In particular, since the diaphragm 1 has a thin thickness, the diaphragm 1 is easily distorted by the compressive force. When the diaphragm 1 is deformed due to the distortion or the like, detection accuracy of the flow rate of the gas is decreased.

In the present embodiment, as shown in FIGS. 6 and 7, the groove 16 is formed on an outer periphery of the opening 6, and the thinned portion 7 is formed on the resin 3 in a region facing the peripheral edge portion in the vicinity of the diaphragm 1.

When the linear expansion coefficient of the lead frame 4 is larger than the linear expansion coefficient of the resin 3, by forming the thinned portion 7, a side of the lead frame 4 that is restricted by the resin 3, facing the thinned portion 7, tends to shrink.

FIG. 8 is a diagram for illustrating bending deformation acting on the diaphragm of the flow-rate sensor due to shrinkage of the resin molding.

When the side of the lead frame 4 facing the thinned portion 7 shrinks, as shown in FIG. 8, bending deformation caused by the upper surface 2a side of the first semiconductor chip 2 becoming convex acts on the first semiconductor chip 2, and this bending deformation acts in a direction that cancels concave deformation caused by the diaphragm 1 being deformed in a direction of protruding toward a void portion 9 side. Therefore, the shrinking force acting on the diaphragm 1 is alleviated, and the distortion of the diaphragm 1 is prevented. When the linear expansion coefficient of the resin 3 is smaller than the linear expansion coefficient of the lead frame 4, the deformation of the diaphragm 1 is greatly prevented.

In a flow-rate sensor in related art, the thinned portion 7 is not formed on the lower side resin portion 13b, and an outer side of the opening 6 is uniformly thicker than the thinned portion 7. In other words, the opening 6 is a rectangular concave formed from a bottom surface of the lower side resin portion 13b. When a thickness of the resin 3 is large, a rigidity of the resin 3 is increased, and thus, shrinkage of the lower surface side of the lead frame 4 is smaller than that of the embodiment having the thinned portion. Therefore, the bending deformation in which the upper surface 2a side of the first semiconductor chip 2 is convex is unlikely to occur. Therefore, as compared with the flow-rate sensor of the embodiment, the concave deformation, which is deformed in the direction of protruding toward the void portion 9 side, is likely occurred on the diaphragm 1.

With reference to FIG. 6, a region of the thinned portion 7 of the resin 3 on the lower surface side of the diaphragm 1 in the X direction will be described. In the following, a positional relationship of each part will be described as a perspective view of the flow-rate sensor as viewed from above.

The thinned portion 7 of the resin 3 on the lower surface side of the diaphragm. 1 is formed in a region facing the peripheral edge portion of the diaphragm 1 located inside the void portion 9 and a peripheral edge portion in a vicinity of an outer side of the void portion 9. According to this configuration, a tensile force due to the bending deformation in which the upper surface side of the first semiconductor chip 2 including the diaphragm 1 is convex on an XZ surface is likely to act on the entire surface of the diaphragm 1. Therefore, as shown in FIG. 6, it is desirable that an X-direction dimension $L_{RX}$ of the thinned portion 7 of the resin 3 on the lower surface side of the diaphragm 1 is at least larger than an X-direction dimension $L_{DX}$ of the diaphragm 1.

With reference to FIG. 7, the region of the thinned portion 7 of the resin 3 on the lower surface side of the diaphragm 1 in the Y direction will be described. The thinned portion 7 of the resin 3 on the lower surface side of the diaphragm 1 is formed in a region opposite to the peripheral edge portion of the diaphragm 1 located inside the void portion 9 and the peripheral edge portion in the vicinity of an outer side of the void portion 9. According to this configuration, a tensile force due to the bending deformation in which the upper surface side of the first semiconductor chip 2 including the diaphragm 1 is convex on a YZ surface is likely to act on the entire surface of the diaphragm 1. Therefore, it is desirable that a Y-direction dimension $L_{RY}$ of the thinned portion 7 of the mold resin on the lower surface side of the diaphragm 1 is at least larger than a Y-direction dimension $L_{DY}$ of the diaphragm 1.

FIG. 6 is compared with FIG. 7.

As shown in FIG. 6, in the X direction, an upper region on one side of the first semiconductor chip 2 and an upper region on the other side, which is opposite to the one side, are covered by the raised portion 12. On the other hand, as shown in FIG. 7, in the Y direction, the surface 15a of the lower back portion 15 of the resin 3 is flush with the upper surface 2a of the first semiconductor chip 2, and the first semiconductor chip 2 is not covered with the resin 3. Therefore, the load in the X direction acting on the first semiconductor chip 2 due to the shrinking force of the resin 3 is larger than that in the Y direction. Therefore, in order to alleviate the load acting on the first semiconductor chip 2, it is necessary to make the bending deformation in which the upper surface 2a side of the first semiconductor chip 2 is convex on the XZ surface larger than that on the YZ surface.

In other words, it is necessary to make the bending on the XZ surface, in which the upper surface 2a side of the first semiconductor chip 2 is convex, easier than the bending on the YZ plane.

For this purpose, it is necessary to increase a length of the thinned portion 7 in the Y direction rather than that in the X direction. It is considered that setting the length of the thinned portion 7 in the X direction to be approximately the same as the length in the Y direction only reduces the rigidity of the resin 3 and has no merit. Therefore, it is desirable that the thinned portion 7 of the resin 3 has a length $L_{RY}$ in the Y direction larger than a length $L_{RX}$ in the X direction. In other words, it is desirable that the thinned portion 7 may have a shape in which a length in a direction along the opening portion 8 of the resin 3, that is, in a direction in which the gas flows is larger than a length in a direction orthogonal to the direction along the opening portion 8.

In the above embodiment, the thinned portion 7 is illustrated as a rectangular shape, but as described above, as long as the thinned portion 7 of the resin 3 has a shape in which the length $L_{RY}$ in the Y direction is larger than the length $L_{RX}$ in the X direction, the thinned portion 7 may have an elongated polygonal shape having five or more vertices or sides, or an elliptical shape.

According to the present embodiment, the following effects can be achieved.

(1) In the flow-rate sensor 100 including the resin 3 that covers the lead frame 4 and the first semiconductor chip 2 by exposing at least a portion of the flow rate detecting unit formed on one surface of the diaphragm 1 from the opening portion, the lower side resin portion 13b of the resin 3 covering the other surface side of the lead frame 4, on the opposite side to the one surface side thereof, includes the thinned portion 7 that is thinner than the periphery thereof, in the region facing the peripheral edge portion of the diaphragm 1. With such a configuration, the side of the lead frame 4 that is restricted by the resin 3, facing the thinned portion 7, tends to shrink, and the bending deformation in the direction in which the deformation acting on the diaphragm 1 due to the shrinkage of the resin 3 is alleviated acts on the diaphragm 1. Therefore, the deformation of the diaphragm 1 can be prevented, and deterioration of the detection accuracy due to the deformation of the diaphragm can be prevented.

(2) The thinned portion 7 extends from a position where the thinned portion 7 faces the inside of the void portion 9 provided below the diaphragm 1 to a position where the thinned portion 7 faces the outside of the void portion 9. That is, the thinned portion 7 is formed in a region facing the peripheral edge portion in the vicinity of the diaphragm 1. Therefore, the bending deformation can be effectively applied to the diaphragm 1.

(3) The upper side resin portion 13a that covers the one surface side of the lead frame 4 includes the first raised portion 12a that covers one side edge of the first semiconductor chip 2, and the second raised portion 12b that is provided so as to be separated from the first raised portion 12a with the opening portion 8 sandwiched therebetween and covers an opposite side region on a side opposite to the one side region of the first semiconductor chip 2, and the thinned portion 7 has the shape in which the length along the opening portion 8 extending in the direction in which a fluid flows is larger than the length in the direction orthogonal to the direction along the opening portion 8. Therefore, a depth of the opening portion 8 that guides the gas flowing is increased, so that in the flow-rate sensor 100 in which the raised portion 12 is provided on the resin 3, the bending deformation can be effectively applied to the diaphragm 1 while the rigidity of the resin 3 is ensured.

First Modification

FIG. 9 shows a flow-rate sensor according to the first modification of the invention, and is a plan view as viewed from a back surface side of the flow-rate sensor.

In the flow-rate sensor 100 shown in the first modification, the thinned portion 7 has a cross shape in a plan view. When a region of the thinned portion 7 increases, the rigidity of the resin 3 decreases, and strength of the flow-rate sensor 100 decreases. Therefore, it is necessary to reduce the region of the thinned portion 7 and to effectively prevent the deformation of the diaphragm 1. As shown in FIG. 9, when the shape of the thinned portion 7 is the cross shape in the plan view, a ratio (area) of a region occupied by the thinned portion 7 in the resin 3 can be made smaller than that of the rectangular shape shown in FIG. 2.

The cross shape shown in FIG. 9 has a vertical portion extending in the Y direction, which is the direction along the opening portion 8, and a horizontal portion extending in the X direction, which is a direction perpendicular to the Y direction, and an intersection of the vertical portion and the horizontal portion is disposed at a position facing a center region of the diaphragm 1. Further, a length of the vertical portion of the thinned portion 7 is larger than a length of the horizontal portion. Therefore, as described above, in a structure having the pair of raised portions 12a, 12b extending in the Y direction, which is the direction along the opening portion 8, the bending deformation in which the upper surface 2a side of the first semiconductor chip 2 is convex in the XZ surface is larger than that in the YZ surface.

Other configurations of the first modification are same as those of the above embodiment.

Therefore, the flow-rate sensor 100 of the first modification also has the same effects (1) to (3) as those of the above embodiment.

Since in the flow-rate sensor 100 of the first modification, the region of the thinned portion 7 can be made smaller than that of the above embodiment, the deformation of the diaphragm 1 can be prevented while the rigidity of the resin 3 is ensured.

Second Modification

FIG. 10 shows a flow-rate sensor according to the second modification of the invention, and is a plan view as viewed from a back surface side of the flow-rate sensor.

The thinned portion 7 of the flow-rate sensor 100 shown in FIG. 10 has a shape that is obtained by deforming the cross-shaped thinned portion 7 shown in FIG. 9, and has a shape in which a step portion 31 is formed around the intersection of the vertical portion and the horizontal portion in the cross shape. The step portion 31 is formed so as to face the peripheral edge portion in the vicinity of the void portion 9 of the diaphragm 1.

Other configurations of the second modification are same as those of the first modification.

Therefore, the flow-rate sensor 100 of the second modification also has the same effects as those of the first modification.

Third Modification

Figure 11B:
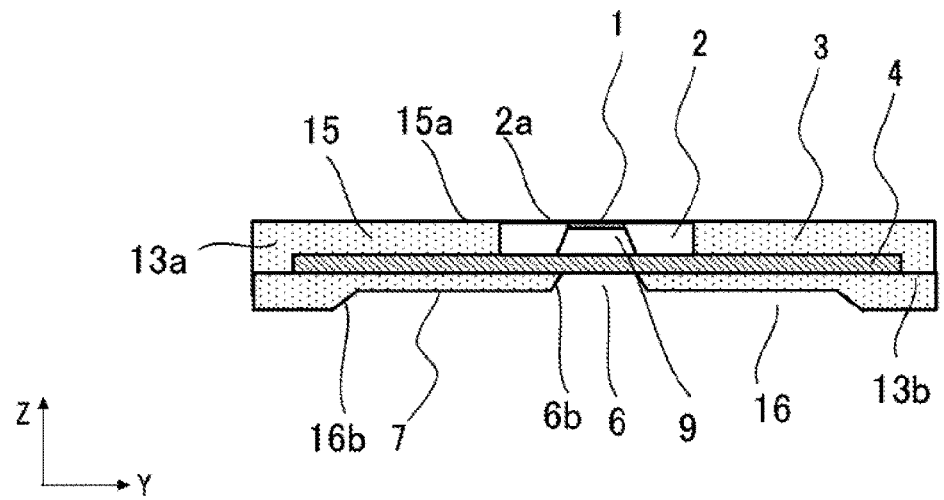

FIGS. 11(a) and 11(b) show a flow-rate sensor according to the third modification of the invention, in which FIG. 11(a) is a cross-sectional view corresponding to FIG. 3, and FIG. 11(b) is a cross-sectional view corresponding to FIG. 4.

The flow-rate sensor 100 of the third modification is different from the above embodiment in that the side surface 6a of the thinned portion 7 shown in FIG. 3 and the side surface 16a of the groove 16 shown in FIG. 4 are respectively set to inclined surfaces 6b, 16b extending outward in a thickness direction of the thinned portion 7.

By respectively setting the side surface of the thinned portion 7 and the side surface of the groove as the inclined surfaces 6b, 16b, entanglement voids during the resin molding can be prevented, and releasability when the flow-rate sensor is taken out from the mold 10 can be improved.

Other configurations of the third modification are same as those in the above embodiment, and corresponding members are denoted by the same reference numerals and description thereof is omitted.

The flow-rate sensor 100 of the third modification also has the same effects (1) to (3) as those of the above embodiment.

Fourth Modification

FIG. 12 shows a flow-rate sensor according to the fourth modification of the invention, and is a plan view as viewed from an upper surface side of the flow-rate sensor.

The flow-rate sensor 100 of the fourth modification is different from the above embodiment in that the pair of raised portions 12a, 12b formed on the upper side resin portion 13a are connected by connecting portions 12c at two end portions in the Y direction. In this way, the raised portions 12a, 12b may be formed in a continuous manner as a whole.

It should be noted that one of the pair of connecting portions 12c may not be formed, so as to be formed in an opened manner.

Other configurations of the fourth modification are same as those of the above embodiment.

Therefore, the flow-rate sensor 100 of the fourth modification also has the same effects (1) to (3) as those of the above embodiment.

Fifth Modification

FIG. 13 shows a flow-rate sensor according to the fifth modification of the invention, and is a plan view as viewed from an upper surface side of the flow-rate sensor.

The flow-rate sensor 100 of the fifth modification is different from the above embodiment in that the pair of raised portions 12a, 12b formed on the upper side resin portion 13a have a length that does not reach both end portions in the Y direction.

On both end portions in the Y direction where the raised portions 12a, 12b are not formed, the opening portion 8 is formed by a step portion between the base portion 14 and the lower back portion 15.

As described above, the raised portions 12a, 12b may not have a configuration having a length over the entire Y direction.

Other configurations of the fifth modification are same as those of the above embodiment.

Therefore, the flow-rate sensor 100 of the fifth modification also has the same effects (1) to (3) as those of the above embodiment.

In the above embodiment, the flow-rate sensor 100 is exemplified as the configuration including the first semiconductor chip 2 and the second semiconductor chip 5. However, a flow-rate sensor including one semiconductor chip can be obtained by providing a control circuit of the flow rate detecting unit on the first semiconductor chip 2.

In the above embodiment and each modification, the resin 3 of the flow-rate sensor 100 is exemplified as the configuration including the raised portion 12. However, a flat structure in which the raised portion 12 is not formed and the entire portion has a thickness of the base portion 14 may be formed. However, even in this case, it is preferable that the surface 15a of the lower back portion 15 is flush with the upper surface 2a of the diaphragm 1, so that the gas can flow smoothly in the opening portion 8 which is a flow passage of the gas.

A through hole that penetrates in the thickness direction (Z direction) may be formed in a portion of the lead frame 4 that faces the void portion 9, and the inside of the void portion 9 may be always open to an outside, so that a pressure difference does not occur inside and outside the void portion 9.

The above embodiment and modifications may be combined with each other.

Although various embodiments and modifications have been described above, the invention is not limited to contents of the embodiments and modifications. Other embodiments that are regarded within the scope of the technical idea of the invention are also included within the scope of the invention.

A disclosed content of the following priority basic application is incorporated herein by reference.

JP-A-2018-132464 (Jul. 12, 2018)

REFERENCE SIGN LIST 1 diaphragm
2 first semiconductor chip (semiconductor chip)
3 resin
4 lead frame
5 second semiconductor chip
6 opening
6a side surface
6b inclined surface
7 thinned portion
8 opening portion (flow passage opening portion)
9 void portion
12 raised portion
12a first raised portion
12b second raised portion
13a upper side resin portion
13b lower side resin portion
16b inclined surface
31 step portion
100 flow-rate sensor
$L_{DY}$ Y-direction dimension of diaphragm 1
$L_{DX}$ X-direction dimension of diaphragm 1
$L_{RX}$ X-direction dimension of thinned portion 7
$L_{RY}$ Y-direction dimension of thinned portion 7

The invention claimed is:

1. A flow-rate sensor comprising:
a lead frame;
a semiconductor chip that is disposed on one surface of the lead frame, and in which a diaphragm including a void portion on the lead frame side is formed;
a flow rate detecting unit that is formed on the one surface including the diaphragm of the semiconductor chip; and
resin that includes a flow passage opening portion exposing at least a portion of the flow rate detecting unit formed on the diaphragm, and covers the lead frame and the semiconductor chip, wherein
a lower side resin portion of the resin covering another surface side, which is on an opposite side to the one surface side of the lead frame, has a thinned portion that is thinner than a periphery thereof in a region facing a peripheral edge portion of the diaphragm,
the thinned portion extends from a position facing an inside of the void portion provided below the diaphragm to a position facing an outside of the void portion, and
an opening is provided in a region of the thinned portion facing a center portion region of the diaphragm.

2. The flow-rate sensor according to claim 1, wherein
an upper side resin portion of the resin that covers the one surface side of the lead frame includes a first raised portion that covers one side region of the semiconductor chip, and a second raised portion that is provided so as to be separated from the first raised portion with the flow passage opening portion sandwiched therebetween and covers an opposite side region on a side opposite to the one side region of the semiconductor chip, and the thinned portion has a shape in which a length along the flow passage opening portion extending in a direction in which a fluid to be detected flows is larger than a length in a direction orthogonal to the direction along the flow passage opening portion.

3. The flow-rate sensor according to claim 2, wherein
the thinned portion has a polygonal shape having four or more vertices or sides, or an elliptical shape in a plan view.

4. The flow-rate sensor according to claim 2, wherein
the thinned portion has a cross shape including a vertical portion extending in the direction along the flow passage opening portion and a horizontal portion extending in the direction orthogonal to the direction along the flow passage opening portion.

5. The flow-rate sensor according to claim 4, wherein
the thinned portion is formed in a shape including a step portion connecting the vertical portion and the horizontal portion at an intersection between the vertical portion and the horizontal portion.

6. The flow-rate sensor according to claim 1, wherein
an inner side surface and an outer side surface of the thinned portion are inclined surfaces that extend outward in a thickness direction of the resin.

7. The flow-rate sensor according to claim 1, wherein
a linear expansion coefficient of the resin is smaller than a linear expansion coefficient of the lead frame.

* * * * *